(12) United States Patent
Tampke (10) Patent No.: US 7,859,403 B2
(45) Date of Patent: Dec. 28, 2010

(54) MONITORING AND ALARMING SYSTEM AND METHOD

(75) Inventor: Michael S. Tampke, Leawood, KS (US)

(73) Assignee: Elecsys Corporation, Olathe, KS (US)

( * ) Notice: Subject to any disclaimer, the term of this patent is extended or adjusted under 35 U.S.C. 154(b) by 343 days.

(21) Appl. No.: 12/186,971

(22) Filed: Aug. 6, 2008

(65) Prior Publication Data

US 2010/0033318 A1   Feb. 11, 2010

(51) Int. Cl.
G08B 1/08   (2006.01)
(52) U.S. Cl. ............................. 340/539.18; 340/539.26; 340/506; 340/531; 340/606; 340/611; 340/614; 340/632
(58) Field of Classification Search ............ 340/539.18, 340/539.17, 539.22, 539.26, 506, 521, 531, 340/605, 606, 611, 614, 632; 702/138, 188
See application file for complete search history.

(56) References Cited

U.S. PATENT DOCUMENTS

| | | | |
|---|---|---|---|
| 6,646,564 B1 * | 11/2003 | Azieres et al. | 340/679 |
| 6,967,589 B1 | 11/2005 | Peters | |
| 7,054,295 B1 | 5/2006 | Nitta | |
| 7,088,239 B2 | 8/2006 | Basinger et al. | |
| 7,263,459 B2 | 8/2007 | Ito et al. | |
| 7,298,278 B2 * | 11/2007 | Miller et al. | 340/603 |
| 7,337,078 B2 | 2/2008 | Bond et al. | |
| 7,701,328 B2 * | 4/2010 | Wall et al. | 340/506 |
| 2004/0098218 A1 | 5/2004 | Ito et al. | |
| 2005/0104724 A1 | 5/2005 | Faltesek | |
| 2006/0052985 A1 | 3/2006 | Ito et al. | |
| 2006/0191324 A1 | 8/2006 | Garabedian et al. | |
| 2007/0206521 A1 | 9/2007 | Osaje | |
| 2008/0088476 A1 | 4/2008 | Wang et al. | |
| 2008/0141754 A1 | 6/2008 | Kates | |

* cited by examiner

Primary Examiner—Hung T. Nguyen
(74) Attorney, Agent, or Firm—Polsinelli Shughart PC (57) ABSTRACT

A system and method for selectively communicating data from a remote facility to a central computing device via one or more communication networks and/or protocols. Measurement data for a particular operation is collected and stored by a field device at the remote facility. The field device compares the collected measurement data to stored threshold data to detect an alarm event or transfer event. If an alarm event is detected, the RTU transfers an alarm message to a user via a first communication network. If a transfer event is detected, the RTU transfers a transfer message to the user via a different communication network. If a no-event is detected, the field device continues to collect and store measurement data for the particular operation.

28 Claims, 5 Drawing Sheets

MONITORING AND ALARMING SYSTEM AND METHOD

RELATED APPLICATIONS

Not Applicable.

FEDERALLY SPONSORED RESEARCH OR DEVELOPMENT

Not Applicable.

COMPACT DISK APPENDIX

Not Applicable.

BACKGROUND OF THE INVENTION

Facility operators, such as utility facility operators, frequently monitor the status of processes or operations occurring at geographically remote facilities at a central location. For example, operators of oil, gas, and/or water facilities may monitor pressure, temperature, flow rates, fluid levels, and other operating parameters at various field sites at a central control station. Each field site may comprise one or more instruments that collect, process and store measurements of operating parameters.

Conventional monitoring systems enable facility operators to remotely monitor processes and/or operations occurring at oil, gas, water, and other utility facilities and to relay process and/or data to one or more central control stations. For example, Supervisory Control And Data Acquisition (SCADA) systems have been developed to monitor and communicate with remote facilities. In SCADA systems, the central control station is typically the Master and a field unit located at the field site is the Slave. This inherently determines how data flows from the field unit back to the office because the Slave can only transfer information to the central control station when it is polled. This means that a field unit cannot initiate the transmission of data to the central control station.

Other systems have been developed that enable operators to remotely communicate with remote oil, gas, water, and other utility facilities via other communication networks such as the Internet. However, the transfer of data via such communication networks can be delayed or lost due to traffic levels and/or connection failures.

Also, conventional systems do not enable field units to selectively communicate process and control data via one or more communication networks and/or protocols.

SUMMARY OF THE INVENTION

According to one aspect, a field device is provided for transmitting a notification signal from a remote facility. The field device comprises a sensor to measure a value of a particular operating parameter at the remote facility. The field device also comprises a memory to store threshold data. The threshold data comprises a target parameter value range, a minimum parameter value, and a maximum parameter value for the particular operating parameter. The field device also comprises a processor that comprises modules executable by the processor. The modules comprise a storage module to store the value of the particular operating parameter in the memory as measurement data. The modules also comprise an event detection module to compare threshold data to the value of the particular operating parameter to detect an event. Events are selected from an alarm event, a transfer event, and a non-event. The modules also comprise a report module to generate a first notification signal comprising measurement data when the transfer event is detected and to generate a second notification signal comprising an alarm message when the alarm event is detected. The field device also comprises a communication system to transmit the first notification signal via a first communication network using a first communication protocol or to transmit the second notification signal via a second communication network using a second communication protocol.

According to another aspect, a system is provided for transmitting a notification from a remote facility. The system comprises a central computing device configured to connect to a first communication network. The system also comprises a telecommunication device configured to connect to a second communication network. The system also comprises a remote transmission unit. The remote transmission unit comprises a sensor to measure a value of a particular operating parameter at the remote facility. The remote transmission unit also comprises a memory to store threshold data comprising a target parameter value range, a minimum parameter value, and a maximum parameter value for the particular operating parameter. The remote transmission unit also comprises a controller that executes modules. The modules comprise a storage module to store the value of the particular operating parameter in the memory as measurement data. The modules also comprise an event detection module to compare threshold data to the value of the particular operating parameter to detect an event. The event is selected from an alarm event, a transfer event, and a non-event. The modules also comprise a report module to generate a first notification comprising measurement data when the transfer event is detected and to generate a second notification comprising an alarm message when the alarm event is detected. The remote transmission unit also comprises a data modem to transmit the first notification to the central computing device the first communication network using a first communication protocol or to transmit the second notification to the telecommunication device via the second communication network using a second communication protocol.

According to another aspect, a method is provided for transmitting a notification signal from a remote facility. The method comprises measuring a value of a particular operating parameter at the facility. The method also comprises storing the value of the particular operating parameter in a memory as measurement data and storing threshold data in the memory, the threshold data comprising a target parameter value range, a minimum parameter value, and a maximum parameter value for the particular operating parameter. The method also comprises comparing threshold data to the value of the particular operating parameter to detect an event. The event is selected an alarm event, a transfer event, and a non-event. The method also comprises generating a first notification signal comprising measurement data when the transfer event is detected and generating a second notification signal comprising an alarm message when the alarm event is detected. The method also comprises transmitting the first notification signal via a first communication network using a first communication protocol and transmitting the second notification signal via a second communication network using a second communication protocol.

BRIEF DESCRIPTION OF THE DRAWINGS

FIG. 2B is a block diagram of a central computing system according to one aspect of the monitoring and alarming system.

DETAILED DESCRIPTION

Aspects of the monitoring and alarming system and method described herein enable the ability to communicate measurement data and/or alarm data from a facility located in the field to destination devices via various communication networks and/or protocols. One advantage of the system is the provision of a field device that is configured to automatically select a desired communication network and/or protocol for communicating measurement data and/or alarm data based on the value of the measurement data collected at the facility. The field device is also configured to communicate data to a central computing device in response to a command or data request received from the central computing device.

Figure 1:
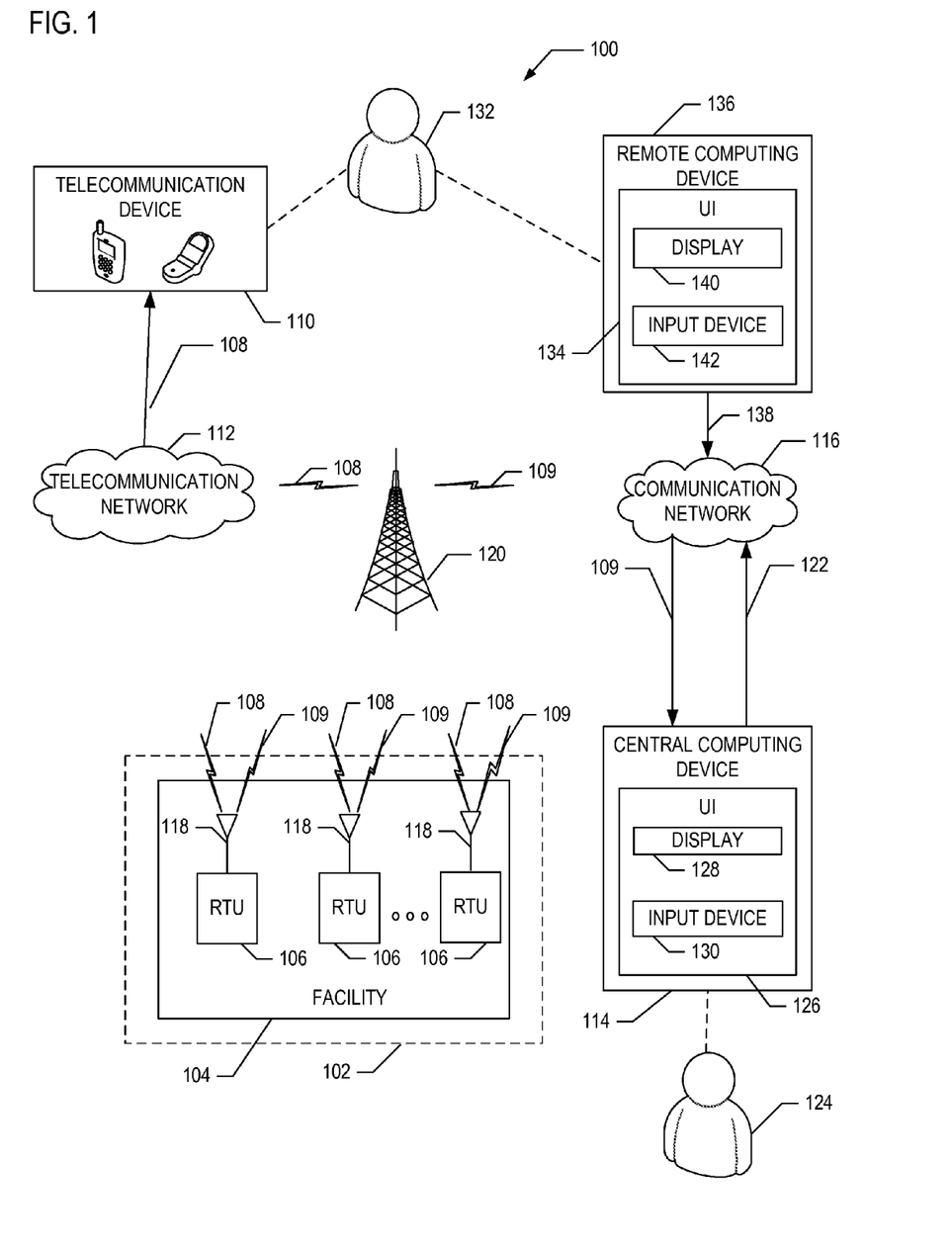
FIG. 1 is a block diagram of a monitoring and alarming system in accordance with an aspect of the present invention.

FIG. 1 depicts an exemplary aspect of a monitoring and alarming system (MAS) 100. A field portion 102 of the MAS 100 comprises components for sensing, recording, and/or transmitting measurement data for a particular operation performed at a utility facility (facility) 104.

According to one aspect, the facility 104 is, for example, a natural gas transmission or distribution facility such as a natural gas pipeline. In this example, the measurement data may comprise natural gas transmission or distribution pressures, natural gas odorant levels, natural gas flow rates, or any other natural gas parameter that can be measured at the natural gas pipeline.

According to another aspect, the facility 104 is, for example, a natural gas city gate or regulating station that reduces natural gas from a higher transmission pressure to a lower distribution pressure. In this example, the measurement data may comprise an inlet pressure to the regulating station (e.g., transmission pressure), an outlet pressure (e.g., distribution pressure), or any other natural gas parameter that can be measured at the regulating station.

According to another aspect, the facility 104 is, for example, an oil tank that stores oil received from an oil well. In this example, the measurement data may comprise hydrostatic measurements, pump-off volumes (e.g., volume of oil pumped to tanker truck), oil levels in the tank, or any other oil parameter that can be measured at the oil tank.

According to another aspect, the facility 104 is, for example, a salt-water disposal tank. In this example, the measurement data may comprise hydrostatic measurement data, tank levels, disposal flow rates, disposal flow volumes, or any other salt-water parameter that can be measured at the disposal tank.

The example facilities described above are not exhaustive, but rather are illustrative of some of the facilities where the MAS 100 can be implemented. It is contemplated that the MAS 100 can be used with any facility for which measurement data for a particular operation or process can be collected and communicated.

The field portion 102 comprises one or more field devices 106, such as remote transmission units (RTUs), that are configured to collect, store, and communicate measurement data for an operation or process conducted at the facility. Each RTU 106 is configured to generate notification signals, as indicated by reference characters 108 and 109, that comprise measurement data representative of one or more operating parameter values and/or an alarm message regarding a particular operation conducted at the facility 104.

According to an aspect of the MAS 100, each RTU 106 is configured to selectively transmit the generated notification signal 108 to one or more telecommunication devices 110 via a telecommunication network 112 or to transmit the generated notification signal 109 to a central computing device 114 via a Transmission Control Protocol/Internet Protocol (TCP/IP) communication network 116. The TCP/IP communication network 116 may be the Internet (or the World Wide Web) that facilitates the transfer of resource data between the RTU 106 and the central computing device 114.

The telecommunication device 110 comprises, for example, a personal digital assistant (PDA), a cellular phone, or a pager, or any other device configured to receive data via the telecommunication network 112. The central computing device 114 comprises, for example, a server, a personal computer, or a laptop, or any other computing device capable of communicating via the TCP/IP communication network 116.

Figure 2A:
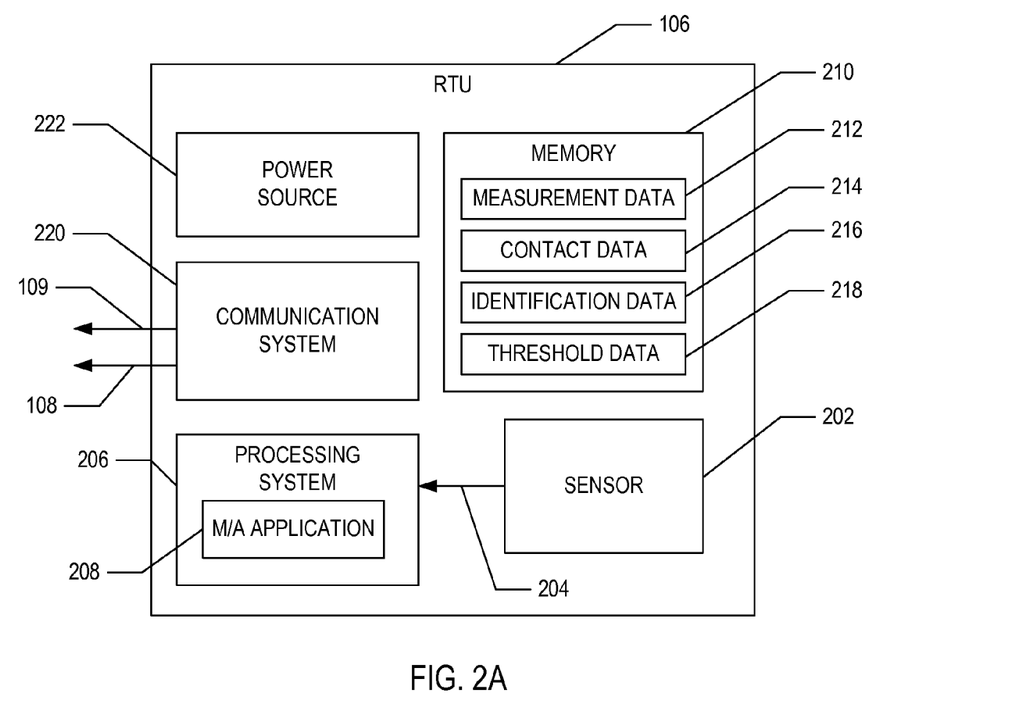
FIG. 2A is a block diagram of a remote transmission unit according to one aspect of a monitoring and alarming system.

A receiver/transmitter component 118 is a transceiver, or antenna, that transmits the notification signals 108, 109 generated by a particular RTU 106 to a communication tower 120 such as a cell tower via a wireless communication link for transmission to the telecommunication device 110 or to the central computing device 114, respectively. As described in more detail in reference to FIG. 2, each RTU 106 is configured to assign an appropriate communication protocol to notification signals 108, 109 for transmission to the telecommunication device 110 or the central computing device 114, respectively.

The receiver/transmitter component 118 is also configured to receive data requests, as indicated by reference character 122, from the central computing device 114. Data request 122 can be manually generated by an administrative user 124 of the central computing device 114 or automatically generated by the central computing device 114.

According to one aspect, the authorized or administrative user 124 interacts with a user interface 126 of the central computing device 114 to generate the data request 122 to receive measurement data collected by the RTU 106. For example, the user interface 126 comprises a display 128, such as a computer monitor, for viewing data entry forms (not shown). The user interface 126 also comprises an input device 130, such as a keyboard or a pointing device (e.g., mouse, trackball, pen, touch pad, or other device), for allowing the administrative user 124 to interact with the displayed forms to specify a particular facility and/or particular RTU 106 from which measurement data is desired.

As another example, the data request 122 comprises a communication ping that is periodically generated by the central computing device 114 to verify that a communication link can be established with the RTU 106 across the TCP/IP communication network 116.

According to another aspect, a remote user 132 interacts with a user interface 134 of a remote computing device 136, such as a person computer, laptop, or hand-held mobile computing device, such as a PDA, to generate a central data request 138 to access and/or view measurement data stored by the central computing device 114. The remote computing device 136 may be coupled to the central computing device 114 via the TCP/IP communication network 116 (e.g., Internet). It is contemplated that a plurality of remote computing devices 136 may be coupled to the to the central computing device 114 via the TCP/IP communication network 116.

A remote computing application (not shown) may be executed on the remote computing device 136 for communicating with the central computing device 114 in order to access and/or view measurement data. The remote computing application can be, for example, a web browsing application. After receiving the measurement data, the remote user 132 uses the user-interface 134 to view and/or interact with the measurement data. The user interface 134 comprises a display 140, such as a computer monitor, for viewing measurement data and an input device 142, such as a keyboard or a pointing device (e.g., mouse, trackball, pen, touch pad, or other device), for allowing the remote user 132 to interact with the measurement data.

FIG. 2A is a block diagram that illustrates an exemplary RTU 106 according to one aspect of the MAS 100. The RTU 106 comprises at least one sensor 202 that is configured to measure or sense the value of a particular operating parameter at the facility 104. The sensor 202 is also configured to generate a measurement signal 204 that comprises measurement data representative of the particular operating parameter measured at the facility 104. For example, if the sensor 202 is a pressure sensor, it generates a measurement signal 204 comprising measurement data representative of an operating pressure. Although the sensor 202 is illustrated as an integral component of the RTU 106, it is contemplated the sensor 202 can be a separate component that is connected to the RTU 106.

A processing system 206 such as a programmable logic controller or a processor employs a software application to process measurement data included in the measurement signal 204 to generate the notification signal 108. As an example, the programmable logic controllers (PLC) is a SCADAPack® model offered by Control Microsystems of Ontario, Canada. According to one aspect, the processing system 206 configures data for transmission from the RTU 106 to the central computing device 114 using a distributed network protocol (DNP3) or via a Modbus RTU protocol, such as used in SCADA systems.

According to another aspect, the processing system 206 executes a monitoring and alarming application 208 to process the measurement data and to determine whether to generate the notification signal 108 or the notification signal 109. For example, the processing system 206 is configured to determine whether to generate the notification signal 108 or the notification signal 109 based on the measurement value sensed for a particular operating parameter. According to one aspect, a communication protocol assigned by the processing system 206 determines whether the notification signal 108 or the notification signal 109 will be generated.

The communication protocol refers to the rules or communication standards used for communicating the notification signal 108 or the notification signal 109 from the RTU 106 to a destination device. For example, the communication protocol for communicating the notification signal 108 to the telecommunication device 110, such as a cellular phone, may comprise transmitting the notification signal 108 via the telecommunication network 112 using any of the available telecommunication standards such as Global System for Mobile Communications (GSM), General Packet Radio Service (GPRS), Enhanced Data Rates for Global Evolution (EDGE), Code Division Multiple Access (CDMA), Universal Mobile Telecommunications System (UMTS), or Short Message Service (SMS). As another example, the communication protocol for communicating the notification signal 109 to the central computing device 114 may comprise transmitting the notification signal 109 via the communication network 116 using any of the available Internet communication protocols such as a transmission control protocol/Internet (TCP/IP) protocol or a Wireless Application Protocol (WAP).

The processing system 206 is coupled to a memory 210 that is configured to store measurement data 212 for the particular operating parameter, including processed and/or raw measurement data. For example, the memory 210 comprises one or more files each comprising processed and/or raw measurement data 212 for a particular operating parameter.

According to another aspect, the memory 210 comprises contact data 214, such as telephone numbers for telecommunication devices 110 for various individuals (e.g. remote users 132) to be notified upon the occurrence of an alarm condition or event. The memory 210 also comprises identification data 216 such as an identification of the facility (e.g., type, name, and/or location), an identification of the particular operating parameter (e.g., pressure, flow rate, etc.) being sensed, and an identification of the RTU 106.

According to another aspect, the memory 210 comprises threshold data 218, such as minimum and maximum values for operating parameters. Threshold data 218 also comprises an ideal operating range for operating parameters.

A communication system 220 is configured to selectively communicate with the telecommunication device 110 or the central computing device 114 by using the communication protocol assigned by the processing system 206. For example, the communication system 220 is configured to transmit the notification signal 108 via the telecommunication network 112 when the assigned communication protocol is a telecommunication protocol such as GSM, GPRS, UMTS, EDGE, CDMA, or SMS. Alternatively, the communication system 220 is configured to transmit the notification signal 109 via the communication network 116 when the assigned communication protocol is Internet based protocol such as a TCP/IP or WAP. In other words, the same communication system 220 is configured communicate the notification signals 108, 109.

According to one aspect, the communication system 220 is a data modem that is configured to wirelessly transmit the notification signal 108 or notification signal 109 via an antenna (e.g., antenna 118). The data modem is, for example, an AirLink™ Raven XT model offered by Sierra Wireless of British Columbia, Canada. Although the communication system 220 is illustrated as being a part of the RTU 106, it is contemplated the communication system 220 may be a separate component connected to the RTU 106.

A power source 222 is configured to provide operational power for the RTU 106. According to one aspect, the power source 222 is an internal power source, such as a rechargeable battery.

According to another aspect, the power source 222 comprises a power transformer that is configured to receive and convert power from an external source to a required operational power level. For example, the power source 222 is configured to receive electrical power via power cord (not shown) that is connected to a local power receptacle (not shown).

According to another aspect, the power source 222 is a solar panel (not shown) configured to convert solar power to electrical power at the required operational power level. Alternatively, the solar panel can be used to recharge a rechargeable battery power source.

Figure 2B:
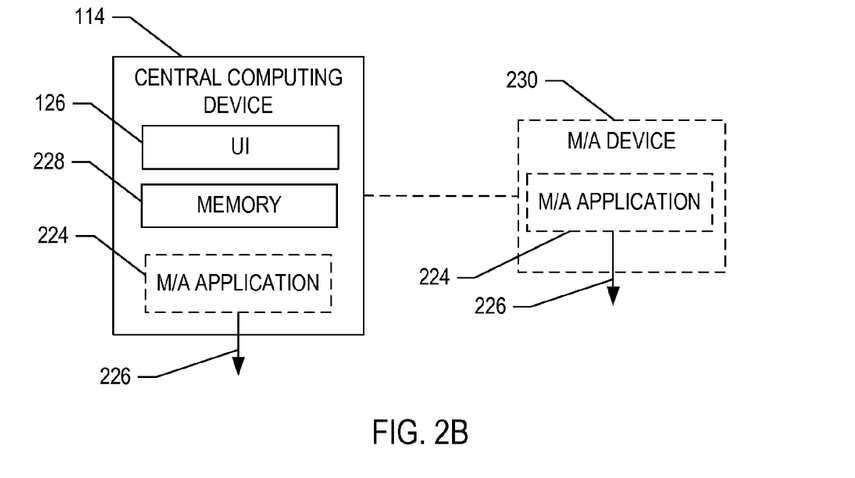
FIG. 2B is a block diagram of a central computing device according to one aspect of a monitoring and alarming system.

FIG. 2B is a block diagram that illustrates an exemplary central computing device 114 according to on aspect of the MAS 100. The central computing device 114 comprises another monitoring and alarming application 224. According to this aspect, the central computing device 114 executes the monitoring and alarming application 224 to determine whether to generate a notification signal 226 that can be communicated directly to the telecommunication device 114.

For example, the central computing device 114 is configured to verify that a communication link can be established with the RTU 106 across the TCP/IP communication network 116 based on a response, or lack thereof, from the RTU 106 based on a ping type data request 122. According to one aspect, if the monitoring and alarming application 224 does not receive a response to a ping request with a predefined time period, the monitoring and alarming application 224 generates the notification signal 226 to transmit to the telecommunication device via the telecommunication network 112 using a telecommunication protocol.

According to another aspect, the monitoring and alarming application 224 is configured to automatically generate the notification signal 226 if a notification signal 109 has not been received from the RTU 106 within another predefined time period (e.g., four (4) hours, eight (8) hours, one (1) day, etc.).

A memory 228 is configured to store measurement data and time threshold data, such as the predefined time periods described above.

According to another aspect, a separate monitoring and alarming device 230 executes the monitoring and alarming application 224 to generate the notification signal 226. For example, the monitoring and alarming device 230 is configured to interface with the central computing device 114, or an existing SCADA system, via an Ethernet connection generates the notification signal 226.

Figure 3:
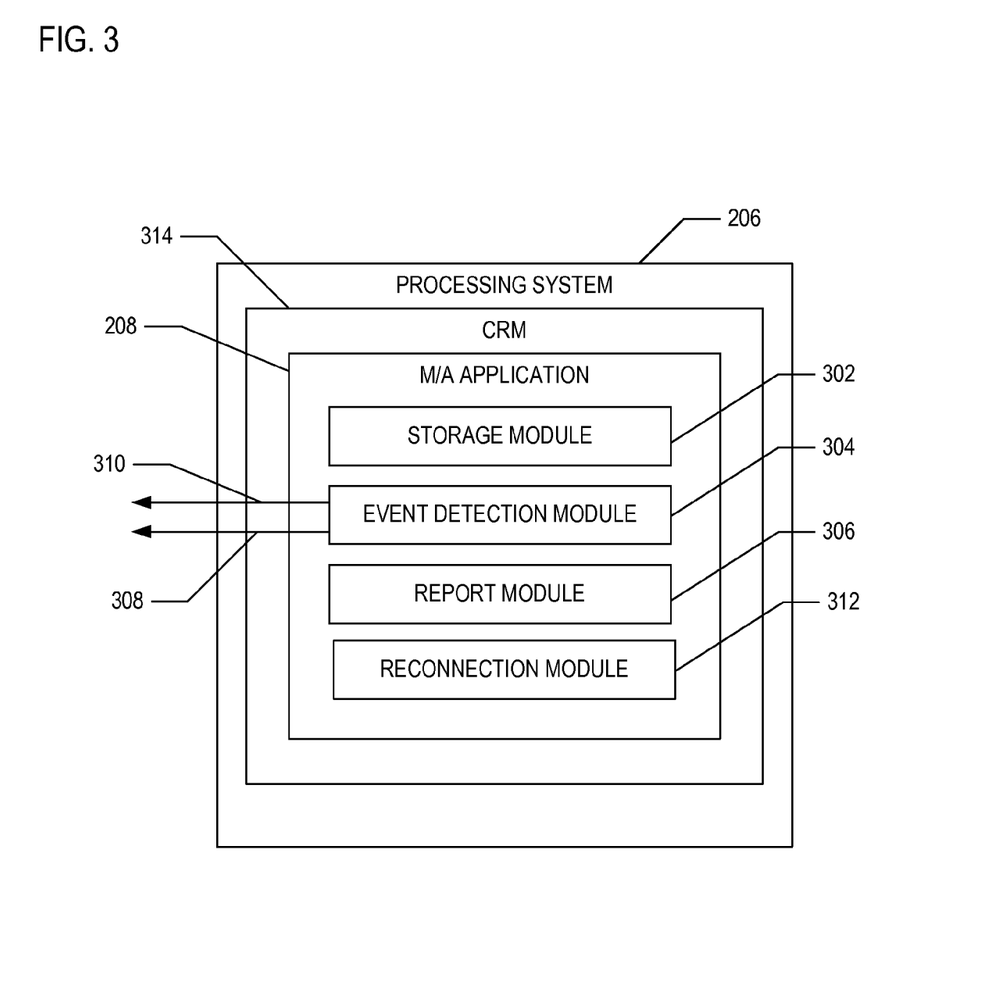
FIG. 3 is a block diagram of a monitoring and alarming application according to one aspect of a monitoring and alarming system.

FIG. 3 illustrates an exemplary monitoring and alarming (M/A) application 208 according to one aspect of the MAS 100. The M/A application 208 comprises instructions or modules that enable the processing system 206 to process measurement data 212 and determine a communication protocol for transmitting the notification (e.g., notification signals 108 or 109) to the telecommunication device 110 or the central computing device 114.

A storage module 302 is configured to convert the measurement signal 204 received from the sensor 202 to a measurement value. The measurement value corresponds to a value of the particular operating parameter being sensed. According to one aspect, the storage module 302 is configured to periodically store the measured value of the particular operating parameter in the memory 210. For example, the storage module 302 stores the measured value of the particular operating at predetermined but unrestricted time-intervals.

An event detection module 304 is configured to compare a current measurement value of a parameter being sensed by the sensor 202 to predetermined parameter limits and/or ranges (e.g., threshold data 218) stored in the memory 210 to determine whether an event has occurred. As an example, the predetermined parameter limits and/or ranges stored in the memory 210 in connection with a natural gas pipeline may comprise a maximum allowable operating pressure (MAOP), a minimum allowable operating pressure (MinAOP), and a preset dead-band range that corresponds to an ideal operating pressure range. The preset dead band corresponds to a percentage of the measurement range of the sensor (e.g., 1% of the 1000 psi scale of a sensor or 10 psi.)

Events comprise data transfer events, alarm events, and non-events (e.g., operating parameter is within ideal or target operating range). A data transfer event occurs when a detected measurement value of the particular operating parameter is not within the ideal operating range, but has not breached maximum and minimum threshold values. For example, when the measurement value of the particular operating parameter is not within the preset dead-band range, the event detection module 304 detects a data transfer event. For illustration, consider that the sensor 202 is a high-pressure natural gas transducer configured to sense pressures between 0 to 1000 pounds per square inch (psi). Further, consider, that the ideal operating pressure is 500 psi. In this example, the ideal operating range may correspond to the pressure range 495-505 psi. A data transfer event would correspond to a measured operating pressure that is below 495 psi and above a predetermined minimum threshold pressure or above 505 psi and below a predetermined maximum threshold pressure.

According to another aspect, the data transfer event corresponds to the expiration of a predefined maximum non-event time period (e.g., 12 hours) during which no events have been detected. This predefined non-event time period is stored in the memory 210. After detecting a previous event such as an alarm event or data transfer event, the event detection module 304 starts a counter and compares a time count to the predefined non-event time period stored in the memory 210. If the event detection module 304 does not detect a data transfer event or an alarm event (i.e., detects a non-event) over the predefined a time period, the event detection module 304 detects a data transfer event and restarts the time count.

A report module 306 is configured to a generate notification upon the occurrence of a particular event. The report module 306 also retrieves measurement values for one or more operating parameters from the memory 210 to include in the notification that will be transmitted the telecommunication device 110 or to the central computing device 114, respectively.

According to one aspect, after detecting a data transfer event, the report module 306 generates a notification 308 (e.g., notification signal 109) and configures the communication system 220 to transfer the notification 308 comprising measurement data 212 across the TCP/IP communication network 116 to the central computing device 114 using a TCP/IP protocol. The transferred measurement data comprises, for example, current measurement data and/or all measurement data 212 that has been stored in the memory 210 from a time a previous data transfer event occurred.

According to another aspect, after detecting the data transfer event, the report module 306 continues to generate and communicate notification signals 308 to the central computing device 114 using the TCP/IP protocol as the measurement value of the particular operating parameter changes and is outside of the ideal operating range. For example, assume an initial data transfer event corresponds to a measured operating pressure of 494 psi, the initial notification signal 308 transmitted to the central computing device 114 comprises the 494 psi measurement data. If the measured operating pressure changes to 492, as sensed by sensor 202, the report module 306 communicates another notification signal 308 to the central computing device 114 that comprises the 492 psi measurement data.

According to another aspect, the event detection module 304 defines a new ideal operating range after receiving a measurement value of the particular operating parameter that is outside of the stored ideal operating range. The new ideal operating range is defined based on the received measurement value and the preset dead band of the sensor. For the example above, if the received measurement value for the operating pressure changes to 492, the new ideal operating range is defined as 487 to 497 psi. The boundaries for the new ideal operating range are determined, for example, by adding and subtracting half of the preset dead band of a 1000 psi sensor (e.g., 10 psi). According to this aspect, the measured operating pressure must change to 486 or 498 psi, as sensed by sensor 202, before the report module 306 communicates another notification signal 308 to the central computing device 114 that comprises current measurement data. As a result, the report module 306 only generates and communicates another notification signal 308 to the central computing device 114 using the TCP/IP protocol if there are significant changes (i.e., greater than sensor error or tolerance) in the measured value of the particular operating parameter.

According to another aspect, if the measurement value of the particular operating parameter is greater than the predetermined maximum threshold value or is less than the predetermined minimum threshold value, the event detection module 304 detects an alarm event. Using the example above, the maximum threshold value may correspond to a MAOP of 550 psi and a MinAOP of 450 psi. In this example, the alarm event would correspond to a measured operating pressure below 450 psi or above 550 psi.

In response to a detected alarm event, the report module 306 configures the communication system 220 to communicate a notification 310 (e.g., notification signal 108) comprising an alarm message and/or measurement data to one or more telecommunication devices 110 based on the stored contact data 214 via telecommunication network 112 using a telecommunication protocol. For example, if the contact data 214 comprises contact information for ten (10) telecommunication devices 110, the notification 310 comprising the alarm message and/or measurement data is communicated to each of the ten telecommunication devices 110. According to one aspect, the alarm message is transmitted using an ASCII protocol for transmitting a SMS text message that comprises the current measurement value of the particular operating parameter being sensed. For example, the measurement value included in the text message corresponds to the value of particular operating parameter at the time of the report message was generated. According to another aspect, the alarm message is a generated voice message.

According to another aspect, the text message comprises identification data 218 retrieved from the memory 210. For example, the text message may comprise an identification of the facility (e.g., name and/or location) and an identification of the RTU unit that generated the alarm message. The text message may also comprise an identification of the particular operating parameter (e.g., pressure, flow rate, etc.), an identification of the corresponding threshold value that has been breached (e.g., MAOP, MinAOP), and an identification of a time and date the alarm event was detected.

According to another aspect, the text message comprises text such as "warning," "alert," or any other text indicative that users 120 attention is required. The text may also include instructions for notifying other appropriate personnel and/or agencies.

According to another aspect, after detecting an alarm event, the event detection module 304 continues to compare current measurement values of the particular operating parameter to the predetermined minimum and maximum thresholds to detect the alarm event. For example, if the measured operating pressure is below the MAOP of 550 psi and above the MinAOP of 450 psi, the particular operation is deemed to be in a non-event state. However, as another example, if the measured operating pressure is still above the MAOP of 550 psi and below the MinAOP of 450 psi, the detection module 304 continues to detect the alarm event.

According to another aspect, the measurement value of the particular operating parameter must be above the minimum threshold level or below the maximum threshold level by a predetermined amount (e.g., 1% of the full scale of a sensor) before a the particular operation is deemed to in the non-alarm state (i.e., non-event). For example, in the natural gas pipeline example, the measured operating pressure must above 460 psi and below 540 psi before the non-event is detected.

According to one aspect, the report module 306 is configured to generate another notification 310 (e.g., alarm message) after a predetermined interval while the operation is deemed to be in the alarm state. In other words, alarm messages will repeat at predetermined intervals while the alarm event is detected. The predetermined intervals for generating such notifications 310 can also be stored in the memory 308.

For example, assume the predetermined interval is one (1) hour. After an alarm event is detected, as described above, the report module 306 transfers an initial notification 310 to one or more telecommunication devices 110 based on the stored contact data 214 via telecommunication network 112. If, after one (1) hour, the event detection module 304 continues to detect the alarm event, then another notification 310 is transferred to the one or more telecommunication devices 110 based on the stored contact data 214. This will continue at the prescribed interval until the event detection module 304 no longer detects an alarm event.

A reconnection module 312 configures the communication system 220 to transfer measurement data 212 across the TCP/IP communication network to the central computing device 114 using the TCP/IP protocol. For example, the reconnection module 312 is configured to automatically reconnect the communication system 220 to the central computing device 114 via the TCP/IP communication network 116 after transmitting a notification 310 (e.g., alarm message) to the telecommunication device 110. According to one aspect, the transfer measurement data 212 comprises all measurement data that has been stored in the memory 210 from a time the alarm event occurred.

According to another aspect, the report module 306 configures the communication system 220 to communicate measurement data 212 to the central computing device 114 using a TCP/IP protocol across the TCP/IP communication network in response to a transfer command (e.g., data request 122). As described above in reference to FIG. 1, an authorized user 124 interacting with the UI 126 of central computing device 114 can generate the command.

Figure 4:
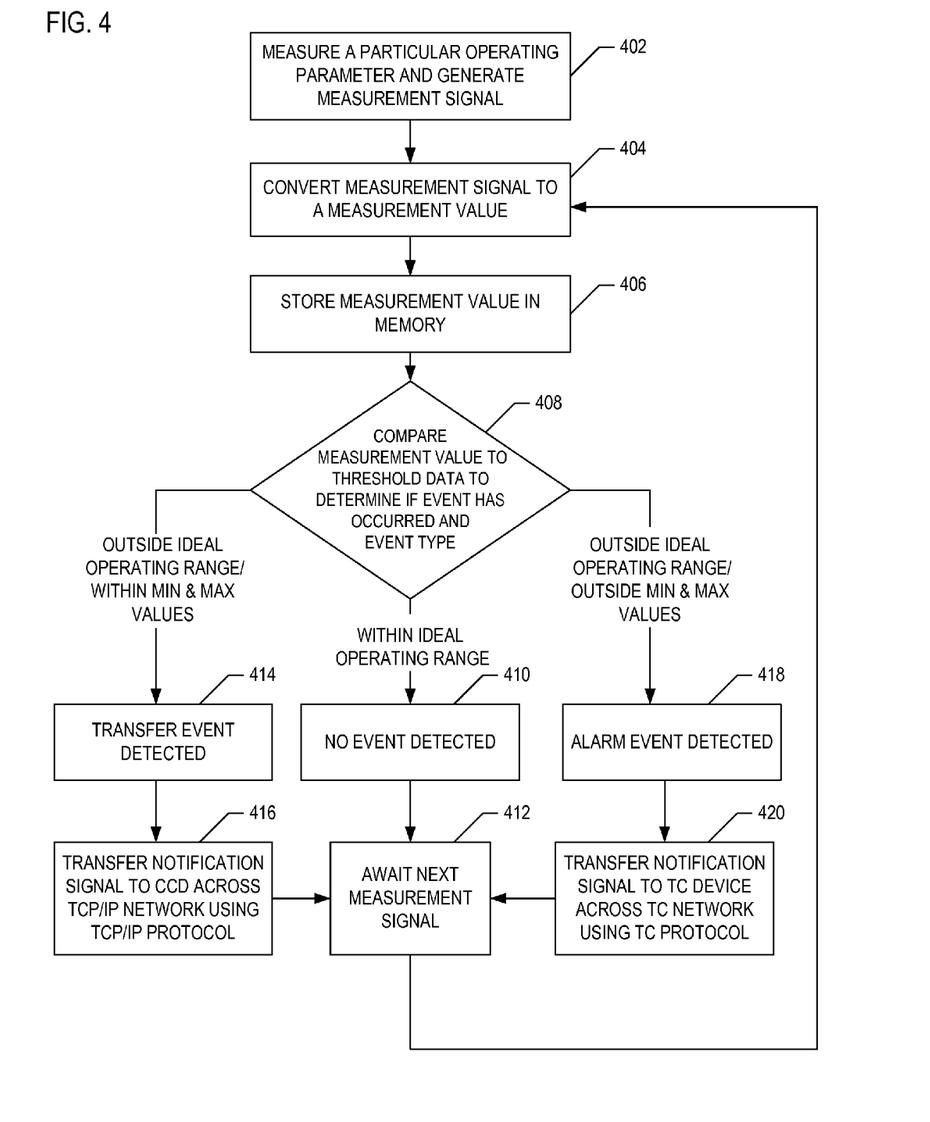
FIG. 4 is a flow chart illustrating a method for selectively communicating data from a field device according to one aspect of a monitoring and alarming system.

FIG. 4 illustrates a method for selectively communicating measurement data from a field device (e.g., RTU 106) according aspects of the monitoring and alarming system illustrated in FIGS. 1 and 2. At 402, the sensor 202 measures a particular operating parameter at the facility 104 and generates the measurement signal 204. The measurement signal 204 is converted to a value at 404. At 406, the measurement value is stored in the memory 210. Threshold data 218 is retrieved from the memory 210 and compared to the measurement value to determine if a transfer event, an alarm event, or a non-event has occurred at 408. For example, the measurement value is compared to an ideal operating range of values and maximum and minimum values for the particular operating parameter to determine if a transfer event or alarm event has occurred.

If the comparison at 408 determines that the measurement value is within the ideal operating range, then no event is detected at 410. If an event is not detected, the RTU 106 awaits to receive the next measurement signal 204 from a sensor 202 at 412. As described above, the RTU 106 is configured to receive measurement signals at predetermined intervals.

If the comparison at 408 determines that the measurement value is not within the ideal operating range and the measurement value has not breached (i.e., less than or greater than) the maximum and minimum values, a transfer event is detected at 414. After detecting the transfer event, the RTU 106 generates the notification signal 109 comprising measurement data 212 that is communicated to the central computing device 114 across the TCP/IP communication network 116 using a TCP/IP protocol at 416. The notification signal 109 comprises measurement data 212 from the memory 210. As described above, the measurement data 212 may comprise all measurement values that have been stored in the memory 210 from a time a previous transfer event occurred. Alternatively, the measurement data 212 transferred from the memory 210 to the central computing device 114 may only comprise the measurement value that caused the transfer event. The notification signal 108 may also comprise corresponding identification data 218.

If the comparison at 408 determines that the measurement value has breached (i.e., less than or greater than) the maximum and minimum values, an alarm event is detected at 418. After detecting the alarm event, the RTU 106 generates the notification signal 108 comprising an alarm message and measurement data 212 that is communicated to the telecommunication device 110 via the telecommunication network 112 using a telecommunication protocol at 420. As described above, the alarm message may be a text message that comprises the measurement value of the particular operating parameter at the time the alarm message was generated. The alarm message may also comprise identification data 218. After communicating the alarm message to the telecommunication device at 420, the RTU 106 reestablishes a connection with the central computing device 114 via the TCP/IP communication network 116.

According to one aspect, after transferring the notification signal 108 to the telecommunication device 110 at 416 or the notification signal 109 to the central computing device 114 at 420, the RTU awaits to receive the next measurement signal 204 from a sensor 202 at 412.

Figure 5:
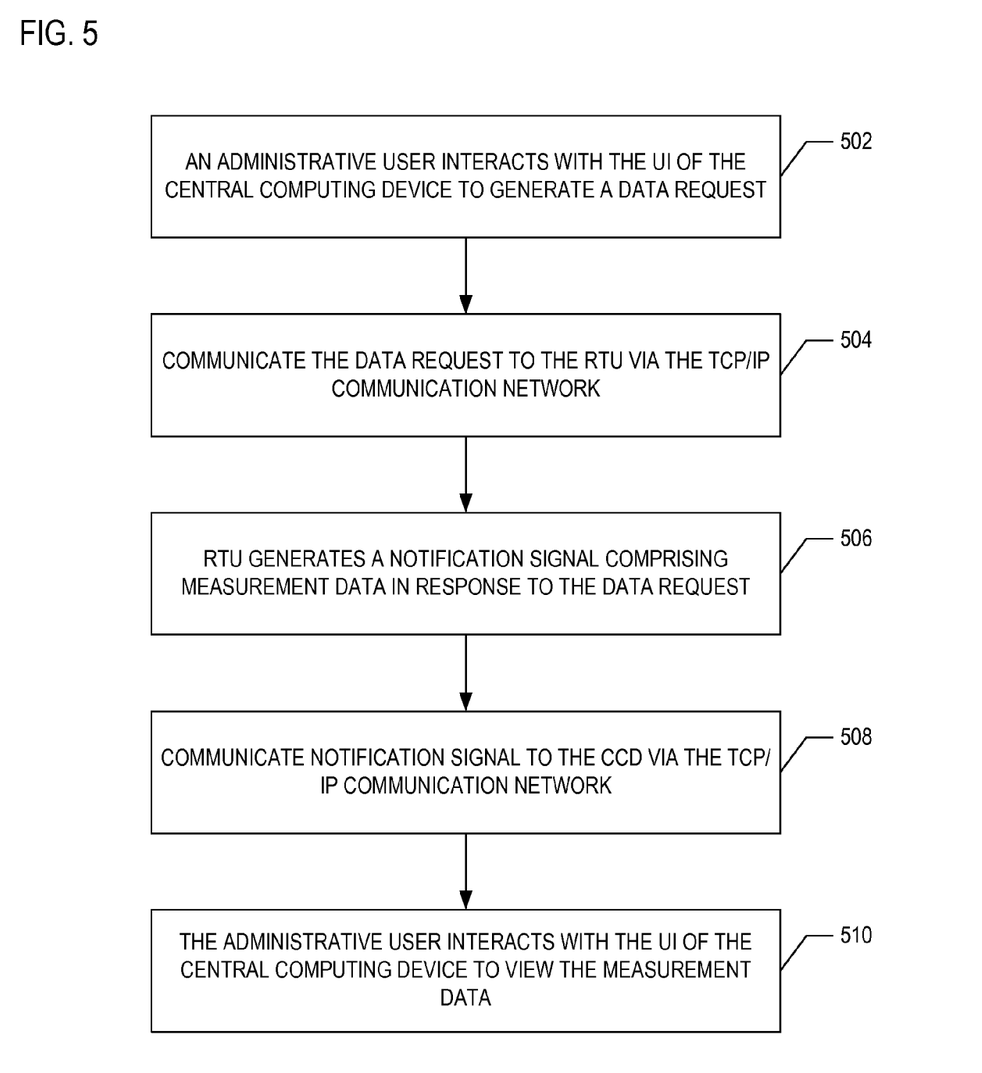
FIG. 5 is a flow chart illustrating a method for requesting data from a field device according to one aspect of a monitoring and alarming system.

FIG. 5 illustrates a method for requesting data from a field device (e.g., RTU 106) according to one aspect of the monitoring and alarming system. At 502, an administrative user 124 interacts with the UI 126 of the central computing device 114 to generate a data request 122. For example, the user 124 interacts with a field data request form (not shown) displayed on the display 128 to identify a particular facility and/or a particular RTU 106 for which measurement data 112 is desired. After identifying the particular facility 104 and/or particular RTU 106, the user 124 interacts with the field data request form to select a retrieve option (e.g., a retrieve control) to generate the data request 122. As another example, the data request 122 can be automatically generated to retrieve measurement data for operating parameters, which are not event initiated. For example, the monitoring and alarming application 224 can be configured to automatically generate a data request 122 to retrieve measurement data such as natural gas flow totals from the particular RTU 106. The data request 122 is communicated to the RTU via the TCP/IP communication network at 504. The particular RTU 106 generates a notification signal 109 in response to the data request 122 at 506. The generated notification signal 109 comprises measurement data stored in the memory 210 associated with the RTU 106. The notification signal 109 is communicated to the RTU 106 via the TCP/IP communication network 116 at 508.

At 510, the administrative user 124 interacts with the UI 126 of the central computing device 114 to view the measurement data 212 included in the notification signal 109. For example, the administrative user 124 views the measurement data 212 via a measurement data display form (not shown) displayed on the display 128.

Those skilled in the art will appreciate that variations from the specific embodiments disclosed above are contemplated by the invention. The invention should not be restricted to the above embodiments, but should be measured by the following claims.

It is contemplated that the RTU 106 typically has at least some form of computer readable media 314. Computer readable media 314, which include both volatile and nonvolatile media, removable and non-removable media, may be any available medium that may be accessed by the RTU 106. By way of example and not limitation, computer readable media 314 comprise computer storage media and communication media. Computer storage media include volatile and nonvolatile, removable and non-removable media implemented in any method or technology for storage of information such as computer readable instructions, data structures, program modules, or other data. For example, computer storage media include RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the RTU 106. Communication media typically embody computer readable instructions, data structures, program modules, or other data in a modulated data signal such as a carrier wave or other transport mechanism and include any information delivery media.

Those skilled in the art are familiar with the modulated data signal, which has one or more of its characteristics set or changed in such a manner as to encode information in the signal. Wired media, such as a wired network or direct-wired connection, and wireless media, such as acoustic, FRO, infrared, and other wireless media, are examples of communication media. Combinations of any of the above are also included within the scope of computer readable media.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense

What is claimed is:

1. A field device for transmitting a notification signal from a remote facility, the field device comprising:
    a sensor to measure a value of a particular operating parameter at the remote facility;
    a memory to store threshold data comprising a target parameter value range, a minimum parameter value, and a maximum parameter value for the particular operating parameter;
    a processor comprising modules executable by the processor, the modules comprising:
    a storage module to store the value of the particular operating parameter in the memory as measurement data;

an event detection module to compare threshold data to the value of the particular operating parameter to detect an event, the event selected from a group consisting of an alarm event, a transfer event, and a non-event; and a report module to generate a first notification signal comprising measurement data when the transfer event is detected and to generate a second notification signal comprising an alarm message when the alarm event is detected; and a communication system to transmit the first notification signal via a first communication network using a first communication protocol or to transmit the second notification signal via a second communication network using a second communication protocol;

wherein the sensor measures a second value of the particular operating parameter after a predetermined time period has elapsed from a time the alarm event was detected, and wherein:

the event detection module is further configured to compare threshold data to the second value to detect the event;

the report module is further configured to generate a third notification signal comprising a second alarm message when the event detection module continues to detect the alarm event; and the communication system is further configured to transmit the third notification signal via the second communication network using the second communication protocol.

2. The device of claim 1 wherein the event detection module detects:

the alarm event when the value is greater than the maximum parameter value or is less than the minimum parameter value;

the transfer event when the value is not within the target parameter value range but is less than the maximum parameter value or is greater than the minimum parameter value; or the non-event when the value is within the target parameter value range.

3. The device of claim 1 wherein the target parameter value range corresponds to a preset dead-band range of the sensor.

4. The device of claim 1 wherein the first communication network comprises an Internet.

5. The device of claim 1 wherein:

the second communication network comprises a telecommunication network; and the alarm message is selected from a group consisting of a short message service text message and a pre-recorded voice call.

6. The device of claim 1 wherein the second notification signal further comprises the value of the operating parameter, a time and date the alarm event was detected, and identification data.

7. The device of claim 1 wherein the communication system transmits:

the first notification signal to a central computing device via the first communication network when the transfer event is detected; and the second notification signal to a telecommunication device via the second communication network when the alarm event is detected.

8. The device of claim 7 wherein the telecommunication device is selected from a group consisting of a personal digital assistant device, a cellular phone, a laptop computer, and a pager.

9. The device of claim 7 further comprising a reconnection module to configure the communication system to reconnect to the first communication network to communicate with the central computing after transmitting the second notification signal to the telecommunication device.

10. The device of claim 1 wherein the memory further comprises contact data for a plurality of telecommunication devices associated with one or more users, wherein the communication system is configured to use the contact data to transmit the second notification signal to the one or more users via the plurality of telecommunication devices.

11. A system for transmitting a notification from a remote facility, the system comprising:

a central computing device configured to connect to a first communication network;

a telecommunication device configured to connect to a second communication network; and a remote transmission unit comprising:

a sensor to measure a value of a particular operating parameter at the remote facility;

a memory to store threshold data comprising a target parameter value range, a minimum parameter value, and a maximum parameter value for the particular operating parameter;

a controller comprising modules executable by the controller, the modules comprising:

a storage module to store the value of the particular operating parameter in the memory as measurement data;

an event detection module to compare threshold data to the value of the particular operating parameter to detect an event, the event selected from a group consisting of an alarm event, a transfer event, and a non-event; and a report module to generate a first notification comprising measurement data when the transfer event is detected or to generate a second notification comprising an alarm message when the alarm event is detected; and a data modem to transmit the first notification to the central computing device the first communication network using a first communication protocol and to transmit the second notification to the telecommunication device via the second communication network using a second communication protocol;

wherein the sensor measures a second value of the particular operating parameter after a predetermined time period has elapsed from a time the alarm event was detected, and wherein:

the event detection module is further configured to compare the threshold data to the second value to detect the event;

the report module is further configured to generate a third notification comprising a second alarm message when the second value is greater than the maximum value or is less than the minimum value; and the data modem is further configured to transmit the third notification comprising the second value to the telecommunication device via the second communication network using the second communication protocol.

12. The system of claim 11 wherein the event detection module detects:

the alarm event when the value is greater than the maximum parameter value or is less than the minimum parameter value;

the transfer event when the value is not within the target parameter value range but is less than the maximum parameter value or is greater than the minimum parameter value; or the non-event when the value is within the target parameter value range.

13. The system of claim 12 wherein:
the memory is further configured to store the threshold data comprising a predefined maximum non-event time period; and
the event detection module is further configured to detect the transfer event after an the predefined maximum non-event time period has expired.

14. The system of claim 11 wherein the target parameter value range corresponds to a preset dead-band range of the sensor.

15. The system of claim 11 wherein:
the first communication network comprises an Internet;
the second communication network comprises a telecommunication network; and
the alarm message is selected from a group consisting of a short message service text message and a pre-recorded voice call.

16. The system of claim 11 wherein:
the central computing device is further configured to transmit a data request to the remote transmission unit in response to input from a user; and
the report module is configured to generate the first notification comprising measurement data is response to the data request.

17. The system of claim 11 wherein the second notification further comprises the value of the operating parameter, a time and date the alarm event was detected, and identification data.

18. The system of claim 11 wherein the telecommunication device is selected from a group consisting of a personal digital assistant device, a cellular phone, a laptop computer, and a pager.

19. The system of claim 11 further comprising a reconnection module to configure the data modem to reconnect to the first communication network to communicate with the central computing device after transmitting the second notification to the telecommunication device via the telecommunication network.

20. The system of claim 11 wherein the memory further comprises contact data for a plurality of telecommunication devices associated with one or more users, wherein the data modem is configured to use the contact data to transmit the second notification to the one or more users via the plurality of telecommunication devices.

21. A method for transmitting a notification signal from a remote facility, the method comprising:
measuring a value of a particular operating parameter at the facility;
storing the value of the particular operating parameter in a memory as measurement data and storing threshold data in the memory, the threshold data comprising a target parameter value range, a minimum parameter value, and a maximum parameter value for the particular operating parameter;
comparing threshold data to the value of the particular operating parameter to detect an event, the event selected from a group consisting of an alarm event, a transfer event, and a non-event;
generating a first notification signal comprising measurement data when the transfer event is detected and generating a second notification signal comprising an alarm message when the alarm event is detected; and
transmitting the first notification signal via a first communication network using a first communication protocol or transmitting the second notification signal via a second communication network using a second communication protocol; and further comprising:
measuring a second value of the particular operating parameter after a predetermined time period has elapsed from a time the alarm event was detected;
comparing the threshold data to the second value to detect the event generating a third notification signal comprising a second alarm message when the second value is greater than the maximum value or is less than the minimum value; and
transmitting the third notification signal via the second communication network using the second communication protocol.

22. The method of claim 21 wherein:
the alarm event is detected when the value is greater than the maximum parameter value or is less than the minimum parameter value;
the transfer event is detected when the value is not within the target parameter value range but is less than the maximum parameter value or is greater than the minimum parameter value; or
the non-event is detected when the value is within the target parameter value range.

23. The method of claim 21 wherein the first communication network comprises an Internet.

24. The method of claim 21 wherein:
the second communication network comprises a telecommunication network; and
the alarm message is selected from a group consisting of a short message service text message and a pre-recorded voice call.

25. The method of claim 21 wherein:
transmitting the first notification signal comprises transmitting the first notification signal to a central computing device via the first communication network when the transfer event is detected; and
transmitting the second notification signal comprises transmitting the second notification signal to a telecommunication device via the second communication network when the alarm event is detected.

26. The method of claim 25 wherein the telecommunication device is selected from a group consisting of a personal digital assistant device, a cellular phone, a laptop computer, and a pager and the central computing device is selected from another group consisting of a personal computer and a server.

27. The method of claim 21 further comprising communicating with the central computing device via the first communication network when the second value is greater than the minimum parameter value or less than the maximum parameter value.

28. The method of claim 21 further comprising:
storing contact data for a plurality of telecommunication devices associated with one or more users in the memory; and
using the contact data to transmit the second notification signal to the one or more users via the plurality of telecommunication devices.

* * * * *